(12) United States Patent
Inui (10) Patent No.: US 8,130,316 B2
(45) Date of Patent: Mar. 6, 2012

(54) IMAGE OUTPUT DEVICE FOR OUTPUTTING MOVING IMAGES IN A PLURALITY OF DISPLAY MODES

(75) Inventor: Yasuhiro Inui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1255 days.

(21) Appl. No.: 11/546,362

(22) Filed: Oct. 12, 2006

(65) Prior Publication Data

US 2007/0097110 A1    May 3, 2007

(30) Foreign Application Priority Data

Oct. 13, 2005   (JP) ................ 2005-299032

(51) Int. Cl.
*H04N 7/01* (2006.01)
(52) U.S. Cl. ...................................... 348/445
(58) Field of Classification Search .......... 348/445, 348/556, 557, 558, 913, 563–565, 569
See application file for complete search history.

(56) References Cited

U.S. PATENT DOCUMENTS

| | | | | |
|---|---|---|---|---|
| 4,990,904 A | * | 2/1991 | Zenda | 345/3.3 |
| 5,805,234 A | * | 9/1998 | Matsuura | 348/558 |
| 5,850,352 A | * | 12/1998 | Moezzi et al. | 345/419 |
| 5,963,268 A | * | 10/1999 | Ko | 348/556 |
| 6,690,425 B1 | * | 2/2004 | Worrell | 348/445 |
| 6,885,406 B2 | * | 4/2005 | Yui et al. | 348/564 |
| 7,046,302 B2 | * | 5/2006 | Konuma | 348/558 |
| 7,525,589 B2 | * | 4/2009 | Sasagawa | 348/333.12 |

FOREIGN PATENT DOCUMENTS

| | | |
|---|---|---|
| JP | 2002-271707 | 9/2002 |
| JP | 2003-348369 | 12/2003 |
| JP | 2005-091430 | 4/2005 |

* cited by examiner

*Primary Examiner* — Paulos Natnael (74) *Attorney, Agent, or Firm* — Pillsbury Winthrop Shaw Pittman, LLP (57) ABSTRACT

An image output device includes a reception unit, an output unit, and a selection reception unit. The reception unit receives a change of setting from a display mode, which is currently set to one of a plurality of display modes, to a different display mode. The output unit outputs an image signal based upon a display mode which has been received. Furthermore, when the receipt of a change of setting by the reception unit has been initiated, the output unit outputs an image for mode selection in which an image based upon the display mode which is currently set, and an image based upon another display mode among the plurality of display modes which is not currently set, are arrayed. The selection reception unit receives a selection of one display mode among the other display modes which are not currently set, among the plurality of display modes.

3 Claims, 8 Drawing Sheets

PRIOR ART

FIG. 1

PRIOR ART

IMAGE OUTPUT DEVICE FOR OUTPUTTING MOVING IMAGES IN A PLURALITY OF DISPLAY MODES

CROSS REFERENCE

This Nonprovisional application claims priority under 35 U.S.C. §119(a) on Patent Application No. 2005-299032 filed in Japan on Oct. 13, 2005, the entire contents of which are hereby incorporated by reference.

BACKGROUND OF THE INVENTION

The present invention relates to an image output device which outputs an image upon a display device, such as an STB (Set Top Box) or a tuner fitted to a television or a DVD replay device or the like.

An image output device such as an STB or a tuner fitted to a television or a DVD replay device or the like which outputs a video (an image) signal upon a display device such as a television or the like is endowed with display modes of a plurality of types, in order to be able to perform output in the optimum display format corresponding to an aspect ratio (4:3, 16:9, and so on) and to the size and the proportions and so on of the display screen.

Such an image output device outputs a video signal based upon the display mode which has been set by the user. Such display modes may include, for example, a "letterbox" mode in which the video signal which is to be outputted is displayed in the aspect ratio of 16:9, a "zoom" mode in which the video signal which is to be outputted is displayed with its center portion magnified, and a "full" mode in which the video signal which is to be outputted is displayed in an aspect ratio of 4:3.

In each of these display modes, processing such as magnification of the video and the like is performed, in order to make the video signal correspond to the set display mode, according to an original aspect ratio and so on of the video signal which is to be outputted. For example, when outputting an video signal which has the original aspect ratio of 16:9 in letterbox mode, it is outputted without any processing such as magnification being performed. Furthermore, when outputting an video signal which has the original aspect ratio of 4:3 in letterbox mode, processing is performed upon the image which is to be outputted so as to compress it in the vertical direction, in order for its aspect ratio to become 16:9.

Figure 1:
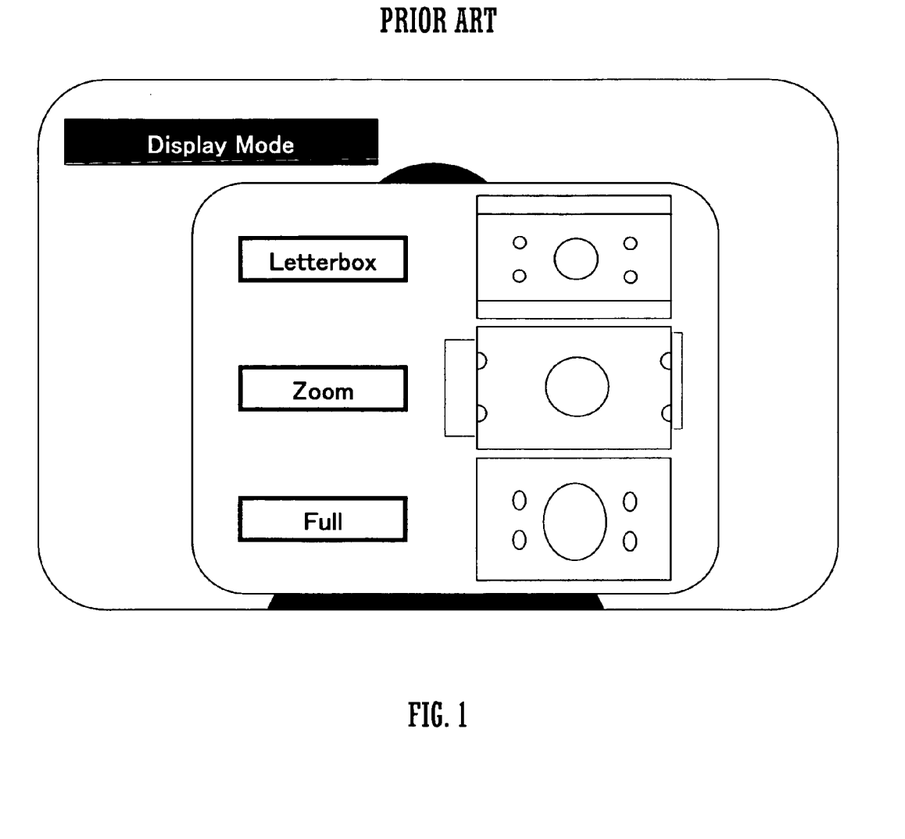
FIG. 1 is an explanatory figure showing a prior art type display mode setting change screen.
Figure 2:
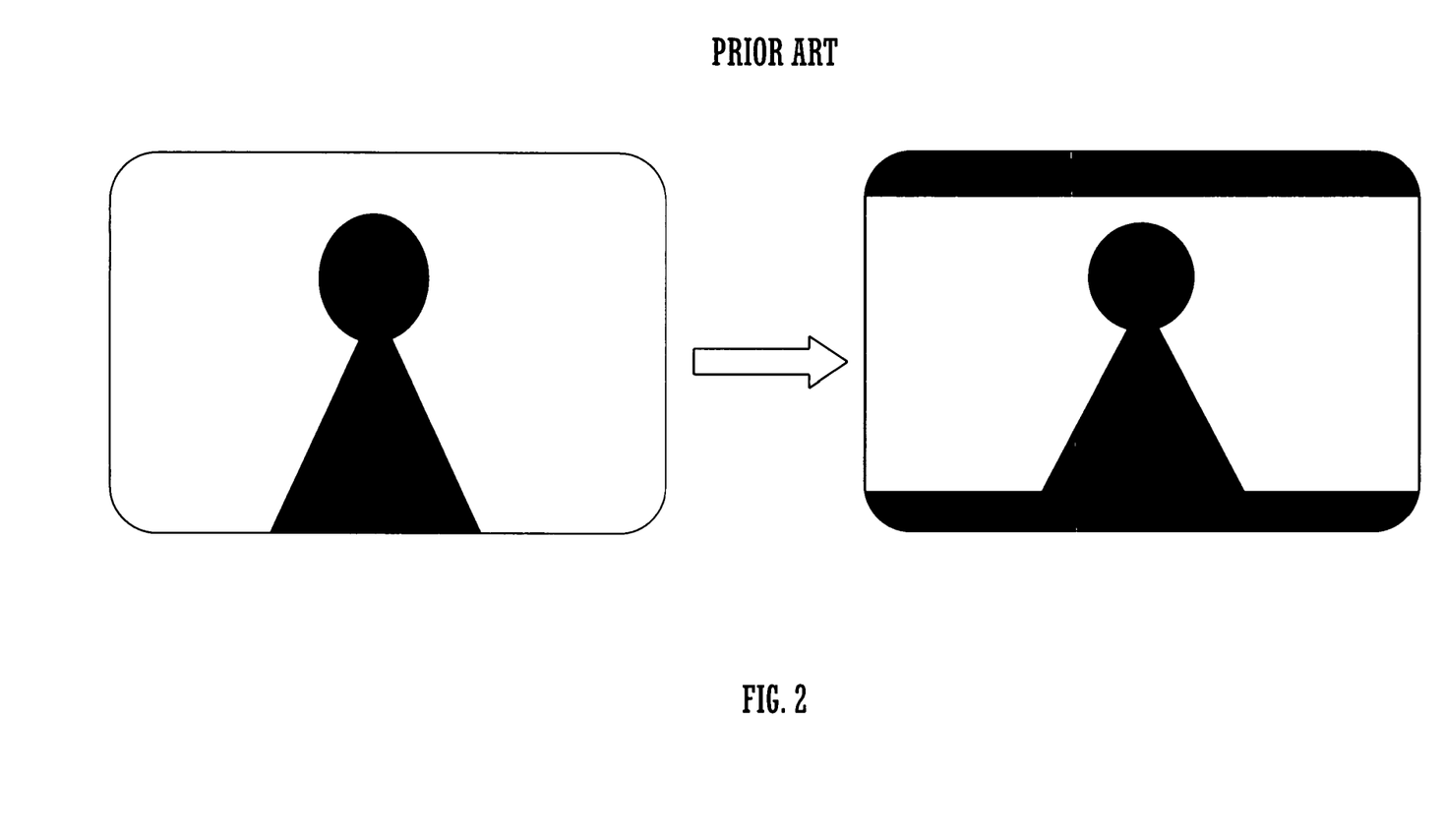
FIG. 2 is an explanatory figure showing a prior art type screen before and after performing a change of display mode setting.

The user performs change of the set display mode by actuating a remote control device or the like, according to his taste. When, during replay of a video, the image output device has received a command to start change of the set display mode, as shown in FIG. 1, it displays an abstract image and a name of each display mode over the video which is being replayed, and awaits receipt of a command for a display mode which user wishes. Or, as shown in FIG. 2, each time that input of a setting change for the display mode is received during replay of a video, the image display device may immediately change the display mode setting to the one which is ordered, and the video may thereafter be outputted based upon the display mode to which change has thus been performed.

It should be understood that the abstract image of each display mode which is shown in FIG. 1 changes according to the original aspect ratio of the video signal which is to be outputted and so on. FIGS. 1 and 2 show cases in which the video which is to be outputted has the original aspect ratio of 16:9.

Furthermore, as disclosed in Japanese Laid-Open Patent Publication 2002-271707, with some modern image output devices, arrangements are made so that the user is able to set the display mode when a modulation method for the image which is being displayed is changed over from a higher level modulation method to a lower level modulation method. Moreover, as disclosed in Japanese Laid-Open Patent Publication 2003-348369, in some cases, there has been proposed a structure in which image output devices are controlled by a single remote actuation device. When the image output device which is the object of control of the single remote actuation device has been changed, the display mode of the image output device after change is set so as to correspond to the display mode of the image output device before change.

Yet further, as disclosed in Japanese Laid-Open Patent Publication 2005-91430, with some modern image output devices, arrangements are made so as, when displaying simultaneously two images such as photographs or the like which have been selected from a plurality of images in order to compare together these images, to provide first and second regions in which the two images are displayed, and third and fourth regions in which thumbnail images for selecting these images which are to be displayed in these first and second regions are displayed, so that thereby selecting and changing the images is made simple and easy.

However, when the user changes the display mode setting, the actual image is not outputted based upon the display mode which has been selected, and no image showing what type of image will be outputted appears to the user until after the change of setting display mode is completed. Due to this, he must decide whether the display mode to which he has changed the setting is the mode which he desires or not, while checking the image which has been outputted after the setting change has been completed, and this entails some trouble.

Furthermore, even if the abstract image signals for all of the display modes are outputted as shown in FIG. 1, it is difficult to anticipate how the video which is being replayed at the moment will be actually displayed after the change of setting display mode is completed.

The object of the present invention is to provide an image output device, with which it is possible for the user to select his desired display mode from among a plurality of display modes in a simple and easy manner.

SUMMARY OF THE INVENTION

The image output device of the present invention includes a reception unit, an output unit, a selection reception unit, and a confirmation reception unit. The reception unit receives a change of setting from a display mode, which is currently set to one of a plurality of display modes, to a different display mode. The output unit outputs an image based upon a display mode which has been received by the reception unit. Furthermore, when the receipt of a change of setting by the reception unit has been initiated, the output unit outputs an image for mode selection in which an image based upon the display mode which is currently set, and an image based upon another display mode among the plurality of display modes which is not currently set, are arrayed. The selection reception unit receives a selection of one display mode among the other display modes which are not currently set, among the plurality of display modes. And the confirmation reception unit receives confirmation of change of setting to the display mode which has been received by the selection reception unit.

DETAILED DESCRIPTION OF THE INVENTION

In the following, an STB which is an embodiment of the image output device according to the present invention will be explained.

Figure 3:
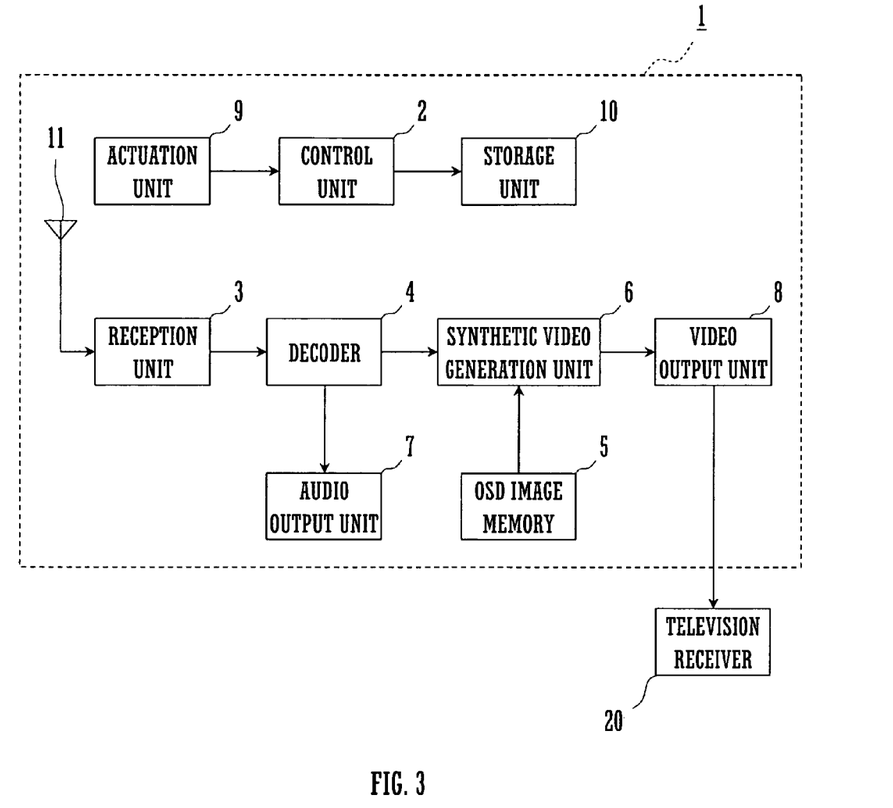
FIG. 3 is a block diagram showing the structure of the main portion of an STB according to an embodiment of the present invention.

FIG. 3 is a block diagram showing the structure of the main portion of this STB which is an embodiment of the present invention. This STB 1 (main body) is an image output device which receives a digitally broadcast program and outputs it upon a television receiver 20. The STB 1 comprises a control unit 2 which controls the operation of its main body, and a reception unit which extracts a video(an image) signal and an audio signal from a television broadcast signal broadcast upon the selected channel which has been received by the antenna 11. Furthermore, the STB 1 comprises a decoder 4 which decodes the video signal and the audio signal which have been extracted by the reception unit 3, and an OSD image memory 5 which stores an OSD image data.

Moreover, the STB 1 comprises a synthetic video generation unit 6 which generates a synthetic video data by superimposing the OSD image data upon an video data of the program based upon the video signal which has been decoded by the decoder 4, and an audio output unit which outputs the audio signal which has been decoded by the decoder 4.

Furthermore, the STB 1 comprises a video output unit 8 which outputs the video data of the program or the synthetic video data, an actuation unit 9 which performs input actuation, and a storage unit 10 which stores various types of setting values, such as a display mode and so on.

The decoder 4 decodes audio data and video data which are encoded with a method like, for example, MPEG (MPEG2). The synthetic video generation unit 6 performs processing for magnifying (or the like) the video data of the program which it has received from the decoder 4, based upon the setting value for the display mode which it has read out from the storage unit 10.

The STB 1 of this embodiment provides three modes: a letterbox mode in which it displays the video which is to be outputted with an aspect ratio of 16:9; a zoom mode in which it displays the video which is to be outputted while magnifying the center portion thereof; and a full mode in which it displays the video which is to be outputted with an aspect ratio of 4:3.

OSD image data is stored in the OSD image memory 5. Not only is the actuation unit 9 provided with a plurality of buttons for performing input actuation, but also it is endowed with a reception function for receiving control codes transmitted from a remote control device not shown in the figures. Furthermore, the actuation unit 9 receives changes of the display mode setting from the user. A television receiver 20 is connected to the audio output unit 7 and to the video output unit 8. On this television receiver 20, it is possible to view a video and to listen to the associated audio, based upon the audio signal (the audio signal) and the video signal(the video data) which are outputted from the audio output unit 7 and from the video output unit 8 respectively. Accordingly, the video output unit corresponds to the "output unit" of the Claims. It should be understood that the television receiver 20 is one whose screen has a basic aspect ratio of 4:3.

Figure 4:
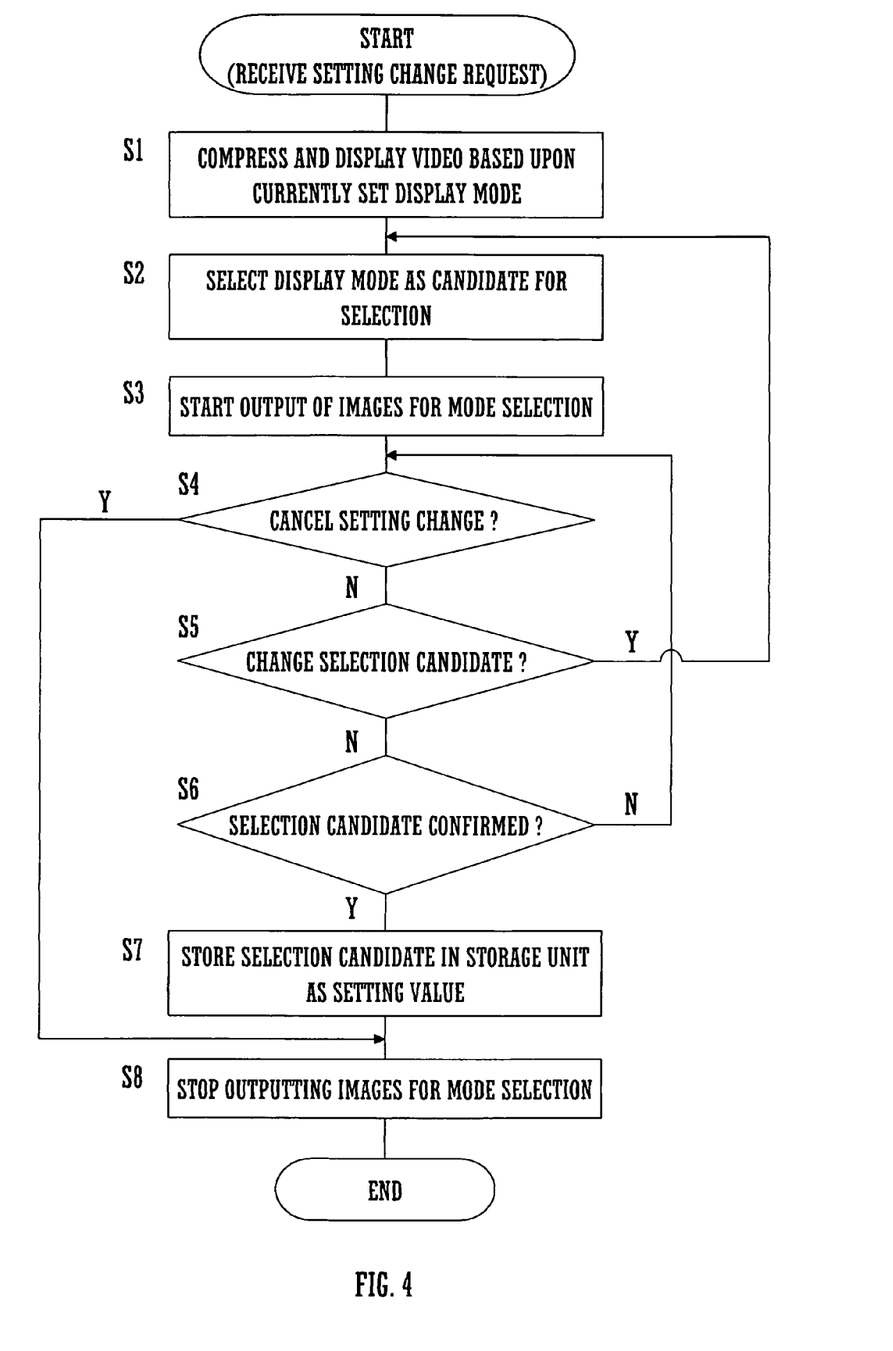
FIG. 4 is a flow chart showing the flow of a procedure for display mode setting change performed by this STB.

FIG. 4 is a figure showing the procedure for changing the display mode setting. When, during replay of the video data, the actuation unit 9 receives initiation for a change of display mode setting via the remote control device or the like, then the control unit 2 compresses and outputs the video data, based upon the display mode which is currently set (S1).

Figure 5:
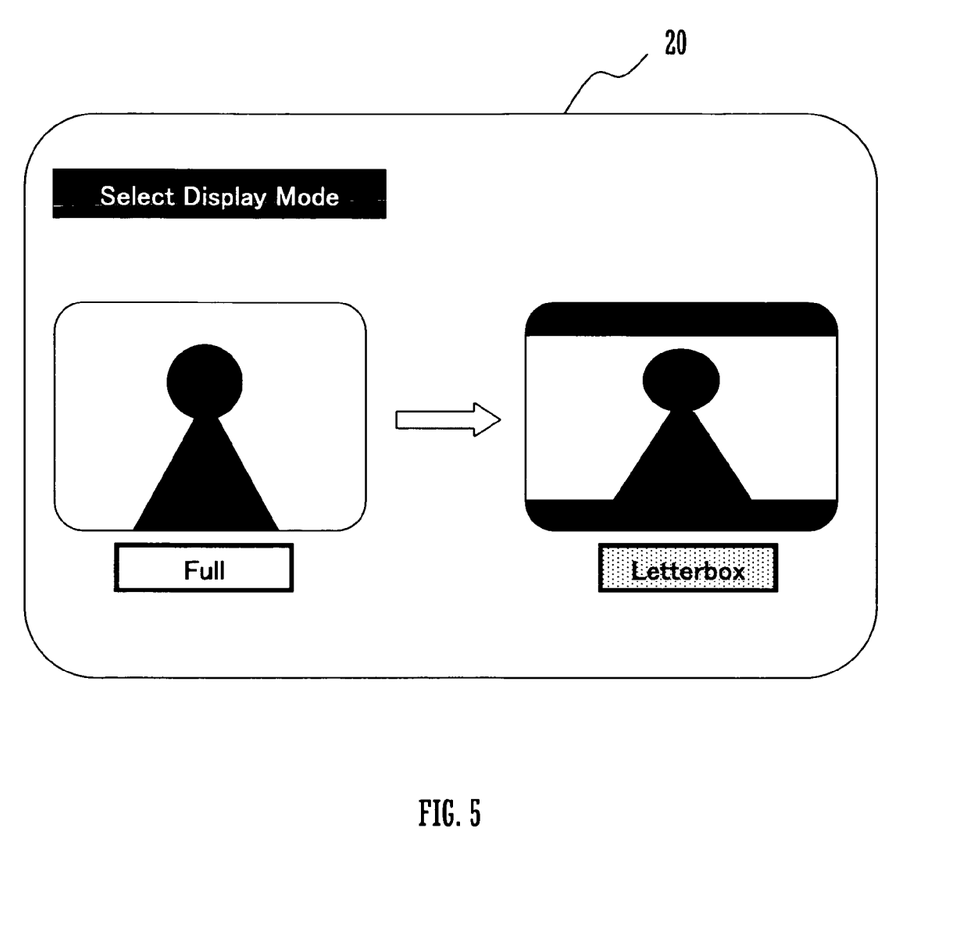
FIG. 5 is a figure showing the structure of an image for display mode selection.

Next, the control unit 2 selects a display mode which is not currently set to become a candidate for selection (S2), and, as shown in FIG. 5, compresses the video based upon this display mode and starts to output an video signal for mode selection together with, and side by side with, the now compressed video based upon the display mode which is currently set (S3). It should be understood that the video on the left side of the drawing paper in FIG. 5 is the compressed video based upon the display mode which is currently set, while the video on the right side of the drawing paper in FIG. 5 is the image for mode selection which is based upon the display mode which is the candidate for selection. Furthermore, FIG. 5 shows a display state based upon a video whose original aspect ratio is 4:3.

The selection of the display mode to be the candidate for selection may be made, for example, by setting in advance an order for the display modes to be selected, and by selecting the next display mode in order from the current selection candidate. Furthermore since, at the time point that a change of setting is initiated, no display mode is currently selected as a selection candidate, accordingly the next display mode in order from the display mode which is currently set may be selected. In this embodiment, the following order is set in advance: the letterbox mode, the zoom mode, and the full mode. For example, if the current setting is the full mode as shown in FIG. 5, then, at the time that a change of setting is initiated, the display mode which is the candidate for selection becomes the next mode on from the full mode which is currently set, i.e. the letterbox mode. It should be understood that the videos based upon these display modes at this time correspond to the same video as the one digitally broadcast and received by the STB 1, and are moving images.

After the output of the images for mode selection has been initiated by the processing of the S3, the control unit 2 decides whether or not a cancellation of the setting change has been received via the remote control device or the like (S4), and, if it has decided that a cancellation has been received, then it terminates the output of the images for mode selection (S8), and the overall processing terminates.

On the other hand, if in the processing of S4 the control unit 2 has decided that no cancellation of the setting change has been received, then a decision is made as to whether or not a request for changing the selection candidate has been received (S5). For example if, based upon the letterbox mode which is the selection candidate shown in FIG. 5, the user is not pleased with the video, and he desires to view a video based upon another display mode, then he may request a change of the selection candidate by actuating the remote control device or the like.

Figure 6A:
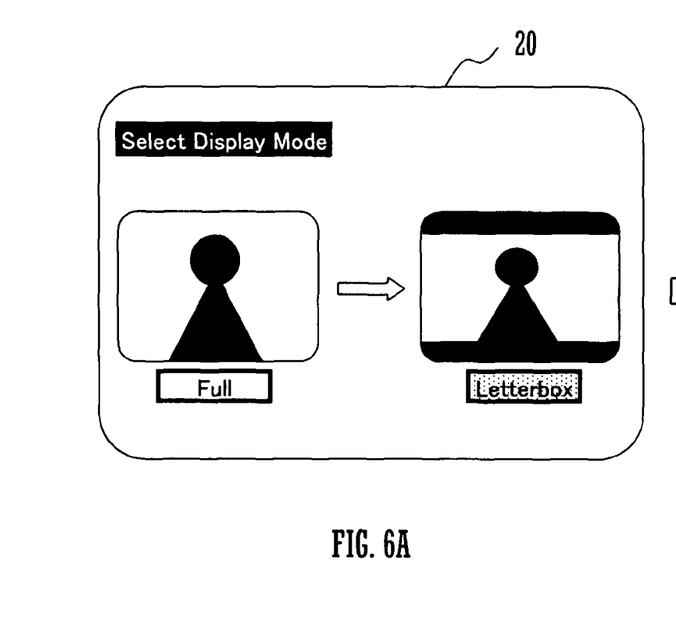
FIGS. 6A and 6B are explanatory figures showing how the image for display mode selection changes, when the candidate image for display mode selection is changed over to the next candidate display mode.
Figure 6B:
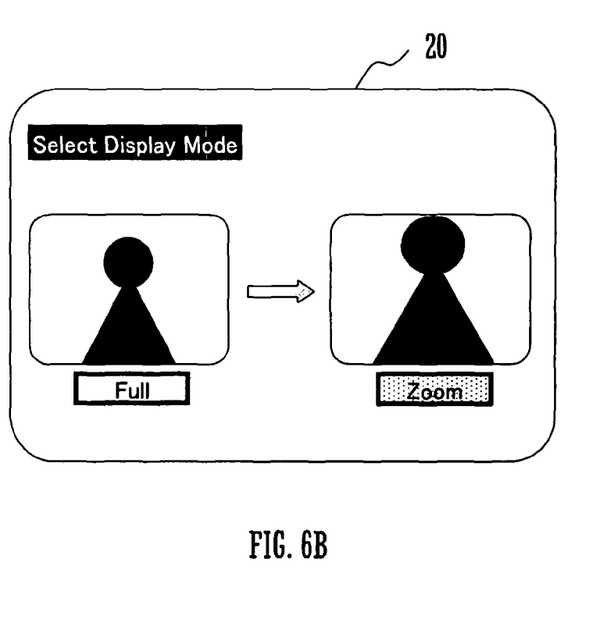

If the control unit 2 has decided by the processing of S5 that a request for change of the selection candidate has been received, then the flow of control is transferred to the processing of S2. For example, when from the state shown in FIG. 5 (FIG. 6A) a request for change of the selection candidate has been received, then, as shown in FIG. 6B, an image for mode selection is outputted which includes (on its right side) a video based upon the zoom mode, which is the next mode in order from the letterbox mode.

On the other hand, if the control unit 2 has decided due to the processing of S5 that no request for change of the selection candidate has been received, then a decision is made as to whether or not a confirmation of the change of setting from the display mode which is currently set to the display mode which is the current setting candidate has been received (S6), and, if it has been decided that no such confirmation has been received, then the flow of control is transferred back to S4.

On the other hand, if in the processing of S6 the control unit 2 has decided that a confirmation has been received, then it stores the display mode which has thus been confirmed (i.e. the current display mode setting candidate) in the storage unit 10 (S7), and then terminates the output of the images for mode selection (S8). By doing this, the actual change of the display mode setting is performed. It should be understood that this confirmation is received by the actuation unit 9 via the remote control device or the like. Thereafter, the overall processing terminates, and the video signal continues to be outputted upon the television receiver 20 based upon this display mode to which change has thus been made. Accordingly, the actuation unit 9 corresponds to the "reception unit", the "selection reception unit", and the "confirmation reception unit" of the Claims.

Figure 7A:
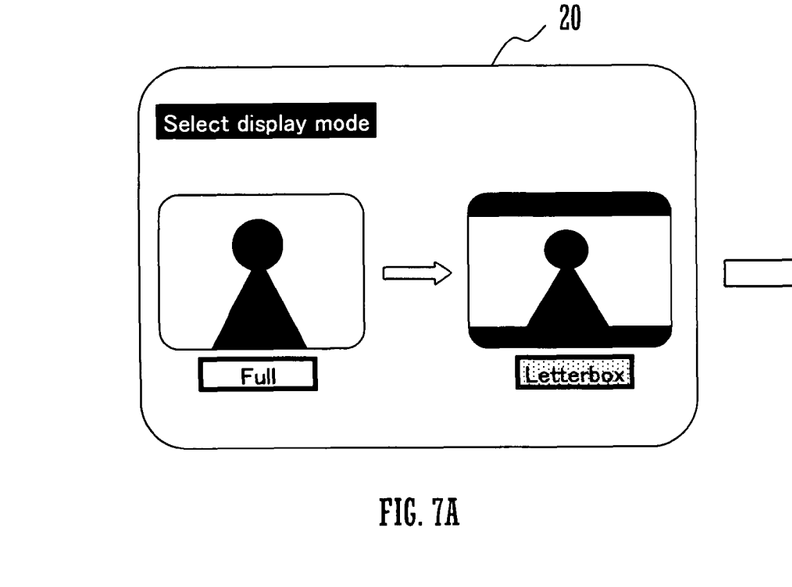
FIGS. 7A and 7B are explanatory figures showing the change from output of the image for display mode selection to normal image output, when, on the image for display mode selection, the current candidate display mode has been confirmed as the setting for the STB.
Figure 7B:
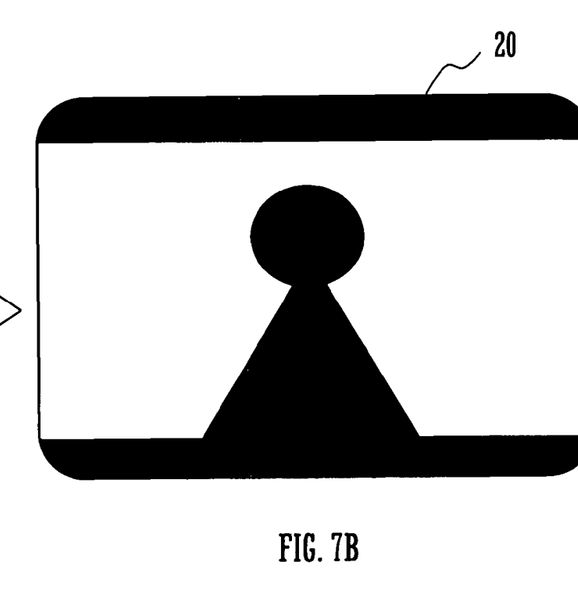

For example when, as shown in FIG. 7A, the user performs actuation for confirmation in the state in which the selection candidate display mode is the letterbox mode, then, as shown in FIG. 7B, the video signal is received and is subsequently outputted based upon the letterbox mode, to which change of setting has been performed. It should be understood that FIG. 7 shows a display state based upon an video whose original aspect ratio is 4:3.

As described above, by outputting an image for mode selection in which a video signal based upon the display mode which is currently set and a video signal based upon another display mode which is not currently set are positioned in an array (here, are displayed side by side), it is possible for the user actually to compare together by eye the video based upon the display mode which is currently set, and the video based upon the other display mode, so that it becomes possible for the user to select the display mode easily.

Furthermore, since these videos for mode selection are outputted as moving images, and not as stationary videos, accordingly it is possible for the user to compare these images more easily, and it becomes possible for him to select the display mode more easily.

Although, in this embodiment, the video for mode selection is outputted when an initiation of change of the display mode setting has been received, it would also be acceptable, for example, to arrange to output the video for mode selection partway through replay, when the original aspect ratio of the video which is being received has changed, in order to invite the user to change the display mode to the optimum display mode.

In concrete terms, for example, during the reception of a video signal having the original aspect ratio of 4:3 and moreover in the state in which the full mode is set, when an video signal which has the original aspect ratio of 16:9 is received, then the video signal for mode selection may be outputted based upon these display modes, since the letterbox mode is, in this case, more optimum than the full mode.

Figure 8:
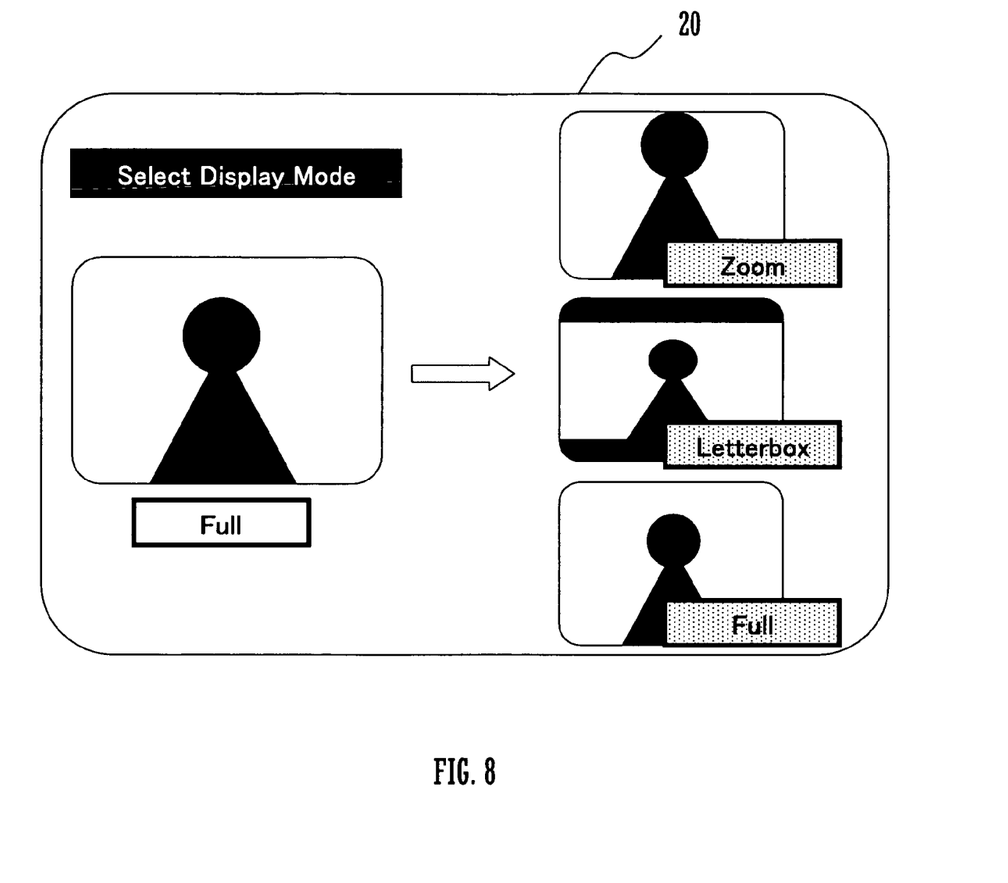
FIG. 8 is a figure showing another variant of the structure of the image for display mode selection.

Furthermore although, in this embodiment, a video signal for mode selection is outputted in which a video signal based upon the display mode which is currently set, and a video signal based upon the display mode which is the candidate for selection, are arranged in an array, it would also be acceptable to arrange to output a video signal for mode selection in which images based upon all the display modes which are available upon the STB 1 are arranged in an array, as shown in FIG. 8. It should be understood that, in FIG. 8, a video which is based upon the display mode which is currently set is positioned on the left side of the drawing paper, while videos based upon the three types of display mode which are available upon the STB 1 are displayed on the right side of the drawing paper.

The user selects the display mode which he desires from among the three types of display mode by actuating the remote control device or the like.

Since, according to this structure, the user is able actually to compare images based upon all of the display modes by eye, accordingly it becomes easier for him to select the most appropriate display mode. It should be understood that although, in FIG. 8, the video based upon the full mode, which is the mode currently set, is displayed on the left side of the drawing paper as overlaid, it could alternatively not be displayed as overlaid. Moreover, in FIG. 8, a display state is shown based upon a video whose original aspect ratio is 4:3.

If the number of types of display mode which are available upon the STB 1 is large, and it is not possible to display videos based upon all of these available display modes all together upon a single screen, then, for example, it would also be acceptable to arrange for the user to select one or mode desired display modes, using the remote control device or the like, and to output only a video based upon the selected display mode or modes.

Furthermore, although in the above explanation an STB 1 has been described, the present invention could also be applied to an image output device such as a tuner housed internally to a television, or a DVD replay device or the like.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. An image output device for outputting moving images in a plurality of display modes, comprising:
   a change reception unit which receives a change of setting from a first display mode, which is currently set to a second display mode which is not currently set, among a plurality of display modes;
   an output unit which outputs to a television receiver, when the receipt of a display mode setting change by the change reception unit has been initiated, an image signal for mode selection producing a single screen image in which a moving image based on the first display mode and a moving image based on the second display mode are displayed in an array format;

a selection reception unit which receives a selection of either one of the first and second display modes which are displayed in the television receiver; and a reception unit which receives a television broadcast signal and extracts a video signal and an audio signal in a program which is broadcast on a selected channel from the television broadcast signal;

wherein the output unit outputs to the television receiver the video signal extracted by the reception unit based on the display mode selected by the selection reception unit.

2. The image output device for outputting moving images in the plurality of display modes as described in claim 1, wherein, when the receipt of a display mode setting change by the change reception unit has been initiated, the output unit outputs to the television receiver an image signal for mode selection producing a single screen image in which moving images based on all display modes are displayed in an array format.

3. The image output device for outputting moving images in the plurality of display modes as described in claim. 1, wherein the plurality of display modes are:

a letterbox mode in which images to be outputted are displayed with an aspect ratio of 16:9;

a full mode in which the images to be outputted are displayed with an aspect ratio 4:3; and a zoom mode in which the images to be outputted are displayed with the center portion thereof magnified.

* * * * *